US010081568B2

(12) United States Patent
Plevacova et al.

(10) Patent No.: US 10,081,568 B2
(45) Date of Patent: Sep. 25, 2018

(54) GLASS PLATE FOR INDUCTION COOKING DEVICE

(71) Applicant: EUROKERA S.N.C., Chateau-Thierry (FR)

(72) Inventors: Kamila Plevacova, Courbevoie (FR); Edouard Brunet, Paris (FR); Emmanuel Lecomte, Nesles la Montagne (FR)

(73) Assignee: EUROKERA S.N.C., Chateau-Thierry (FR)

( * ) Notice: Subject to any disclaimer, the term of this patent is extended or adjusted under 35 U.S.C. 154(b) by 511 days.

(21) Appl. No.: 14/437,567

(22) PCT Filed: Oct. 29, 2013

(86) PCT No.: PCT/FR2013/052584
§ 371 (c)(1),
(2) Date: Apr. 22, 2015

(87) PCT Pub. No.: WO2014/068242
PCT Pub. Date: May 8, 2014

(65) Prior Publication Data
US 2015/0274579 A1    Oct. 1, 2015

(30) Foreign Application Priority Data

Oct. 30, 2012  (FR) ..................... 12 60354

(51) Int. Cl.
| | |
|---|---|
| *C03C 4/02* | (2006.01) |
| *C03C 3/091* | (2006.01) |
| *C03C 10/00* | (2006.01) |
| *C03C 3/083* | (2006.01) |
| *C03C 3/089* | (2006.01) |
| *H05B 6/12* | (2006.01) |
| *C03C 3/085* | (2006.01) |
| *C03C 3/087* | (2006.01) |

(52) U.S. Cl.
CPC .............. *C03C 3/091* (2013.01); *C03C 3/083* (2013.01); *C03C 3/085* (2013.01); *C03C 3/087* (2013.01); *C03C 3/089* (2013.01); *C03C 4/02* (2013.01); *C03C 10/0027* (2013.01); *C03C 10/0045* (2013.01); *H05B 6/1209* (2013.01); *H05B 6/1218* (2013.01); *C03C 10/0054* (2013.01); *H05B 2206/02* (2013.01)

(58) Field of Classification Search
CPC ........ H05B 6/1209; H05B 6/12; H05B 6/065; H05B 6/062; C03C 4/02; C03C 10/0018; C03C 10/0027; C03C 10/0036; C03C 10/0045; C03C 10/0054
USPC ............ 99/451, DIG. 14; 219/620, 622, 624
See application file for complete search history.

(56) References Cited

U.S. PATENT DOCUMENTS

| | | | |
|---|---|---|---|
| 5,352,640 | A | 10/1994 | Combes et al. |
| 5,726,109 | A | 3/1998 | Ito et al. |
| 6,515,263 | B2 * | 2/2003 | Mitra ................ C03C 10/0027 |
| | | | 219/443.1 |
| 6,930,289 | B2 * | 8/2005 | Siebers ..................... C03C 4/02 |
| | | | 219/452.11 |
| 7,501,365 | B2 | 3/2009 | Doehring et al. |
| 2004/0070120 | A1 | 4/2004 | Doehring et al. |
| 2013/0098903 | A1 | 4/2013 | Di Giovanni et al. |
| 2013/0256301 | A1 | 10/2013 | Laurent et al. |

FOREIGN PATENT DOCUMENTS

| | | |
|---|---|---|
| CN | 1376137 A | 10/2002 |
| EP | 0 705 800 | 4/1996 |
| EP | 1 081 107 | 3/2001 |
| JP | H07-069669 A | 3/1995 |
| JP | 10-72236 A | 3/1998 |
| JP | 2007-529400 A | 10/2007 |
| JP | 2011-121841 A | 6/2011 |
| WO | WO 01/17920 A1 | 3/2001 |
| WO | 2012 001300 | 1/2012 |
| WO | 2012 080672 | 6/2012 |

OTHER PUBLICATIONS

International Search Report dated Jan. 21, 2014 in PCT/FR2013/052584 Filed Oct. 29, 2013.
Makishima et al. "Glass Material Design Assistance System: VitrES" Fujistu, 44, 6, pp. 560-565 (partial translation of the relevant passages cited by the Japanese Examiner).

* cited by examiner

*Primary Examiner* — Reginald L Alexander
(74) *Attorney, Agent, or Firm* — Oblon, McClelland, Maier & Neustadt, L.L.P.

(57) ABSTRACT

The subject matter of the invention is a reinforced glass plate for an induction cooking device, the chemical composition of which comprises the following colorants, in a content which varies within the weight limits defined hereinafter: $Fe_2O_3$ (total iron): 0.8% to 1.8%, CoO: 0.02% to 0.06%, Se: 0 to 0.005%, $Cr_2O_3$: 0 to 0.1%. The invention is also directed towards an induction cooking device comprising at least one inductor placed under such a glass plate.

18 Claims, 1 Drawing Sheet

GLASS PLATE FOR INDUCTION COOKING DEVICE

Figure 1:
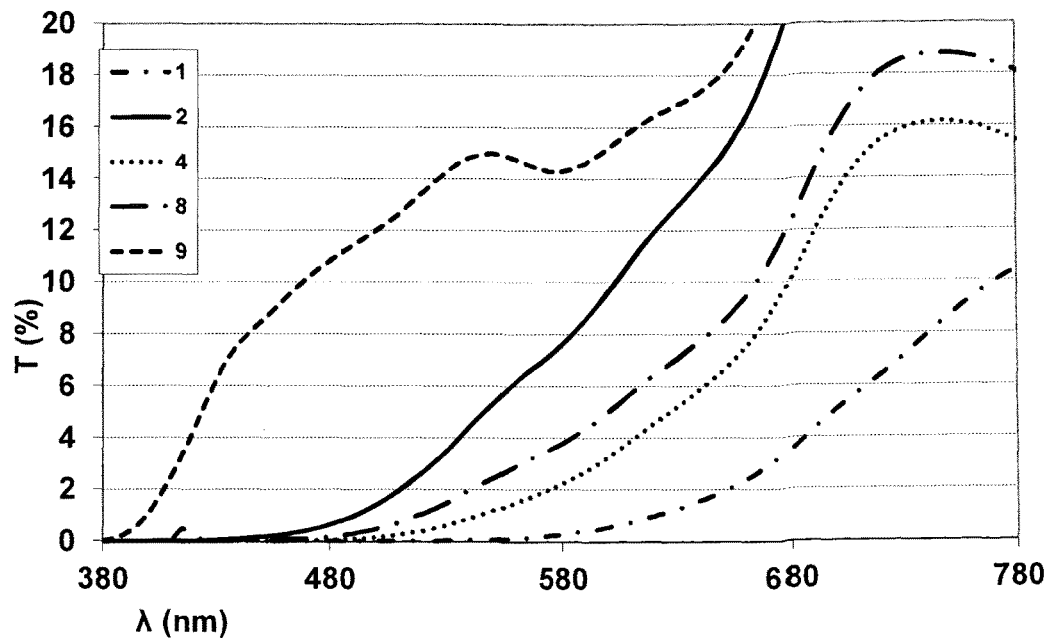

The invention relates to the field of induction cooking appliances.

Induction cooking appliances comprise at least one inductor placed under a glass-ceramic plate. These appliances are fitted into worktops or the chassis of stoves. The plate serves to hold items of cookware (saucepans, skillets, etc.) which are heated by virtue of the electric current induced therein by the magnetic field generated by the inductors. Lithium aluminosilicate glass-ceramics are employed for this purpose because of their resistance to thermal shocks, consequence of their thermal expansion coefficient of zero or almost zero. Glass-ceramics are produced by subjecting to a high-temperature heat treatment plates of lithium aluminosilicate glass, which treatment generates within the plate crystals of beta-quartz or beta-spodumene structure the thermal expansion coefficient of which is negative. The glass-ceramic material is therefore made up of crystals connected by a residual vitreous phase; it is therefore not a glass.

These glass-ceramic plates, for example sold by the Applicant under the trade name KeraBlack, generally have a dark hue by virtue of the addition of vanadium, hue that allows internal parts under the plate to be hidden from view.

It has been proposed in patent application WO 2012/080672 to use plates made of lithium aluminosilicate glass in this type of appliance. In order to hide the inductors, electrical cabling and the command/control circuits of the cooking appliance from view, it is proposed to equip the plate with optical coatings, or even to introduce into the glass plate coloring agents in order to decrease the light transmission thereof.

Induction cooking appliances also incorporate display means, for example means employing light-emitting diodes (LEDs). Although for many years the LEDs used for this application have often been red, it is now being proposed to use LEDs, or more generally display means, emitting blue, green or even white light. The rendering of the colors of these light-emitting devices seen through the plate then becomes a crucial problem.

One aim of the invention is to provide glass plates for induction cooking appliances that have a hue similar to the hue of the dark glass-ceramics currently available on the market, thereby allowing the internal elements of the appliance to be hidden from view. Furthermore, another aim of the invention is to ensure displays, especially white displays, display correctly without major distortion of their color.

For this purpose, one subject of the invention is a plate made of strengthened glass for an induction cooking appliance, the chemical composition of which comprises the following colorants, in a content varying within the limits by weight defined below:

| | |
|---|---|
| $Fe_2O_3$ (total iron) | 0.8 to 1.8% |
| CoO | 0.02 to 0.06% |
| Se | 0 to 0.005% |
| $Cr_2O_3$ | 0 to 0.1%. |

Another subject of the invention is an induction cooking appliance comprising at least one inductor placed under a glass plate according to the invention.

The inventors have demonstrated that choosing these coloring agents from the claimed range of contents allows glass plates that are very similar in appearance to glass-ceramic plates colored using vanadium to be obtained, this ensuring that internal elements of the appliance are satisfactorily hidden from view. It also turns out that this choice of colorants does not generally create significant distortion of colors. Blue, green, red or even white displays are then perfectly rendered, despite the low light transmission of the plate.

The expression "strengthened glass" is understood to mean that compressive stresses are present at the surface of the glass, due to a preferably thermal or chemical strengthening process.

Thermal strengthening is also called tempering or toughening. It consists in heating the glass above its glass transition temperature, then rapidly cooling it, generally by means of nozzles that blow air onto the surface of the glass. As the surface cools more rapidly than the bulk of the glass, compressive stresses form at the surface of the glass plate, balanced by tensile stresses in the bulk of the plate. Chemical strengthening, sometimes called chemical tempering, is a treatment implementing an ion exchange. The substitution of a surface ion of the glass plate (generally an alkali-metal ion such as a sodium or lithium ion) with an ion of larger ionic radius (generally an alkali-metal ion, such as a potassium or sodium ion) allows residual compressive stresses to be created at the surface of the glass plate, to a certain depth. Preferably, the glass is thermally strengthened.

In order to have an optimal thermomechanical strength allowing the glass plates to withstand the most severe tests of use, the glass preferably has at least one of the following properties:
- the ratio c/a of the glass before strengthening is at most 3.0 after Vickers indentation under a load of 1 kg, c being the length of the radial cracks and a being the half-diagonal of the Vickers indentation;
- the ratio $\sigma/(e.E.\alpha)$ is at least 20 $K.mm^{-1}$, even 25 or 30 $K.mm^{-1}$, $\sigma$ being the maximum stress generated in the bulk of the glass by the strengthening in Pa, e being the thickness of the glass in mm, E being Young's modulus in Pa and $\alpha$ being the linear thermal expansion coefficient of the glass in $K^{-1}$.

The thickness of the plate is preferably at most 4.5 mm, especially 4 mm and even 3.5 mm. This thickness is generally at least 2 mm. The glass plate preferably has a lateral dimension of at least 0.5 m and even 0.6 m. The largest dimension is generally at most 1.50 m. The number of inductors is preferably at least 2, especially 3 or 4. Specifically, it is for this type of appliance that the choice of the glass becomes most particularly crucial.

The glass of the plate according to the invention preferably has at least one of the 6 following properties, in any possible combination:

1. the product $E.\alpha$ of Young's modulus (in Pa) and of the linear thermal expansion coefficient of the glass (in $K^{-1}$) is comprised between 0.1 and 0.8 $Mpa.K^{-1}$, especially between 0.2 and 0.5 $MPa.K^{-1}$ and in particular between 0.2 and 0.4 $MPa.K^{-1}$. Too low a product $E.\alpha$ makes the thermal tempering more difficult, whereas too high a product $E.\alpha$ decreases resistance to thermal shocks.

2. the strain point of the glass is at least 500° C., especially 600° C. and even 630° C. This temperature is preferably at most 800° C., especially 700° C. The strain point corresponds to the temperature at which the viscosity of the glass is $10^{14.5}$ poises (1 poise=0.1 Pa.s). High strain points make it possible to prevent any detempering of the glass during operation of the cooking appliance.

3. the linear thermal expansion coefficient of the glass is at most $50 \times 10^{-7}/K$ and is especially comprised between 30 and $45 \times 10^{-7}$/K, even between 32 (or 35) and $45 \times 10^{-7}$/K. High thermal expansion coefficients do not allow a satisfactory resistance to thermal shocks to be obtained. In contrast, too low a thermal expansion coefficient makes it difficult to strengthen the glass sufficiently.

4. the ratio c/a of the glass before strengthening is at most 2.8, especially 2.7 or 2.5 and even 0.5 or 0.2 or 0.1. This ratio is even preferably zero. Surprisingly, this property, despite the fact it is measured before the glass has been strengthened, turns out to have an impact of paramount importance on the strength of the plates during actual use of cooking appliances according to the invention.

5. the ratio $\sigma/(e.E.\alpha)$ of the glass is at least 20, especially 30 $K.mm^{-1}$. The ratio $\sigma/(e.E.\alpha)$ is normally at most 200 $K.mm^{-1}$, even 100 $K.mm^{-1}$. This property has been observed to have a large impact on preventing any risk of the plate breaking during use of the cooking appliance.

6. the maximum stress generated in the bulk of the glass by the strengthening is preferably at least 20 MPa, especially 25 or 30 MPa, and even 40 MPa.

In order to optimize its thermomechanical strength, the glass used according to the invention preferably has all these properties, preferably in combination. Other combinations are possible, especially the combinations of properties 1+2, 1+3, 1+4, 1+5, 1+6, 2+3, 2+4, 2+5, 2+6, 3+4, 3+5, 3+6, 4+5, 4+6, 5+6, 1+2+3, 1+2+4, 1+2+5, 1+2+6, 1+3+4, 1+3+5, 1+3+6, 1+4+5, 1+4+6, 1+5+6, 1+2+3+4, 1+2+3+5, 1+2+3+6, 1+3+4+5, 1+3+4+6, 1+3+5+6, 1+4+5+6, 1+2+3+4+5, 1+2+3+4+6, 1+2+3+5+6, 1+2+4+5+6, 1+3+4+5+6.

In particular, the glass used is preferably thermally tempered and preferably has the following properties: its thickness is at most 4.5 mm, the ratio c/a is at most 2.5, and the ratio $\sigma/(e.E.\alpha)$ is at least 20 $K.mm^{-1}$ or even 30 $K.mm^{-1}$.

The linear thermal expansion coefficient is measured according to standard ISO 7991:1987 between 20 and 300° C. and expressed in $K^{-1}$. Strain point is measured according to standard ISO 7884-7:1987.

The Young's modulus (or elastic modulus) E is measured by a four-point bending of a $100 \times 10 \times 4$ mm$^3$ glass sample. The two lower pins are located a distance of 90 mm from each other, whereas the two upper pins are located a distance of 30 mm from each other. The upper pins are centered relative to the lower pins. The force is applied to the middle of the sample, from above. Strain is measured using a strain gauge, and Young's modulus is calculated as being the ratio of the stress to the strain. Measurement uncertainty is generally about 3 rel %. The Young's modulus is expressed in Pa.

The ratio c/a is measured as detailed below. A TestWell FM7 Vickers indenter is loaded with P=1000 g at room temperature for 30 s, the rate of descent being equal to 50 μm/s. The measurements of a (half-diagonal of the Vickers indentation) and c (length of the radial cracks, starting from the corners of the indentation, in the direction of the diagonal) are carried out using an optical microscope 1 h after the experiment. The result is the arithmetic mean obtained from a set of 10 measurements.

Bulk stress σ (maximum tensile stress generated in the bulk of the glass by the strengthening) is measured by photoelasticimetry using a polariscope, for example the polariscope sold by GlassStress under the trade name SCALP-04. For a plate, stresses are generally measured at the center of the plate (2 measurements), and at its 4 corners, but at least 10 cm from the edges. The result is an average of these 6 measurements, expressed in Pa.

The colorants may be added to various types of glass matrices, especially matrices of the lithium aluminosilicate, borosilicate or even alumino-borosilicate type, these matrices having thermomechanical and damage-resistance properties that make them usable, under appropriate conditions, in induction cooking appliances.

According to a first preferred embodiment, the chemical composition of the glass is of the lithium aluminosilicate type.

In this case, the chemical composition of the glass preferably comprises silica $SiO_2$ in a content by weight ranging from 49 to 750, alumina $Al_2O_3$ in a content by weight ranging from 15 to 30% and lithium oxide $Li_2O$ in a content by weight ranging from 1 to 8%.

The chemical composition of the glass advantageously comprises the following constituents, varying within the limits by weight defined below:

| | |
|---|---|
| $SiO_2$ | 49-75%, especially 52-75% |
| $Al_2O_3$ | 15-30%, especially 18-27% |
| $Li_2O$ | 1-8%, especially 2.5-5.5% |
| $K_2O$ | 0-5%, especially 0-3% |
| $Na_2O$ | 0-5%, especially 0-3% |
| ZnO | 0-5%, especially 0-3.5% |
| MgO | 0-5%, especially 0-3% |
| CaO | 0-5%, especially 0-2.5% |
| BaO | 0-5%, especially 0-3.5% |
| SrO | 0-5%, especially 0-2% |
| $TiO_2$ | 0-6%, especially 0-3% |
| $ZrO_2$ | 0-5%, especially 0-3% |
| $P_2O_5$ | 0-10%, especially 0-8% |
| $B_2O_3$ | 0-5%, especially 0-3%. |

Silica ($SiO_2$) is the main network-forming oxide of the glass. High contents will contribute to increasing the viscosity of the glass above an acceptable level, whereas if its content is too low the thermal expansion coefficient of the glass will increase. Alumina ($Al_2O_3$) also contributes to increasing the viscosity of the glass and to decreasing its expansion coefficient. It has a beneficial effect on Young's modulus.

Lithium oxide ($Li_2O$) is preferably the only alkali-metal oxide present in the composition, except for unavoidable impurities. Too high an alkali-metal oxide content increases the tendency of the glass to devitrify. Alkali-metal oxides allow the glass to be fluidified and therefore facilitate its melting and fining, but caustic soda and potash have the disadvantage of increasing the thermal expansion coefficient of the glass and of decreasing its strain point. Lithium oxide allows low thermal expansion coefficients to be maintained, relative to other alkali-metal oxides. It has also been observed that lithium oxide allows exceptionally low values, even values of zero in certain cases, to be obtained for the ratio c/a, these values being particularly advantageous in the targeted application. The high mobility of lithium ions, due to their small size, could be the origin of this property.

The alkaline-earth oxides and the barium oxide (BaO) are useful for facilitating the melting of the glass and its fining, and for the effect they have of reducing viscosity at high temperatures.

Magnesium and zinc oxides have proved to be particularly useful for obtaining low c/a ratios. In contrast, calcium, boron, strontium and barium oxides have a tendency to increase this ratio, so much so that their content is preferably kept down. Preferably, the composition of the glass is devoid of $B_2O_3$.

The titanium and zirconium oxides are not essential, but their presence contributes to increasing the Young's modulus of the glass. The sum of their contents by weight is therefore advantageously at least 1% and even 2%. Since titanium oxide may lead to yellow or amber colors being obtained, its content is however advantageously at most 1%, even 0.5% and even zero, excluding unavoidable impurities.

According to a second preferred embodiment, the composition of the glass is of the borosilicate type.

In this case, the chemical composition of the glass preferably comprises silica $SiO_2$ in a content by weight ranging from 70 to 85%, boron oxide $B_2O_3$ in a content by weight ranging from 8% to 20% and at least one alkali-metal oxide, the total content by weight of alkali-metal oxides ranging from 1 to 10%.

The chemical composition of the borosilicate glass preferably comprises (or essentially consists of) the following constituents, varying within the limits by weight defined below:

| | |
|---|---|
| $SiO_2$ | 70-85%, especially 75-85% |
| $B_2O_3$ | 8-16%, especially 10-15% or 9-12% |
| $Al_2O_3$ | 0-5%, especially 0-3% or 2-5% |
| $K_2O$ | 0-2%, especially 0-1% |
| $Na_2O$ | 1-8%, especially 2-6%. |

Preferably, the composition may furthermore comprise at least one of the following oxides: MgO, CaO, SrO, BaO, ZnO, in a total content by weight ranging from 0 to 10%, and especially CaO in a content by weight ranging from 1 to 2%.

According to a third preferred embodiment, the composition of the glass is of the alumino-boro-silicate type and especially devoid of alkali-metal oxides.

In this case, the chemical composition of the glass preferably comprises silica $SiO_2$ in a content by weight ranging from 45% to 68%, alumina $Al_2O_3$ in a content by weight ranging from 8 to 20%, boron oxide $B_2O_3$ in a content by weight ranging from 4% to 18%, and alkaline-earth oxides chosen from MgO, CaO, SrO and BaO, in a total content ranging from 5 to 30%, the total content by weight of alkali-metal oxides not exceeding 10%, especially 1% and even 0.5%. The expression "devoid of alkali-metal oxides" is understood to mean that the total content by weight of alkali-metal oxides is at most 1%, especially 0.5% and even 0.1%.

The chemical composition of the alumino-borosilicate glass preferably comprises (or essentially consists of) the following constituents, varying within the limits by weight defined below:

| | |
|---|---|
| $SiO_2$ | 45-68%, especially 55-65% |
| $Al_2O_3$ | 8-20%, especially 14-18% |
| $B_2O_3$ | 4-18%, especially 5-10% |
| RO | 5-30%, especially 5-17% |
| $R_2O$ | at most 10%, especially 1%. |

As is customary in the art, the expression "RO" designates the alkaline-earth oxides MgO, CaO, SrO and BaO, whereas the expression "$R_2O$" designates the alkali-metal oxides. Such compositions allow very low c/a ratios to be obtained, especially of at most 1 and even 0.6.

The expression "consists essentially of" will be understood to mean that the aforementioned oxides make up at least 96% and even 98% of the weight of the glass. The composition usually comprises additives serving to fine the glass. The fining agents are typically chosen from oxides of arsenic, antimony, tin, cerium, the halogens and metal sulfides (especially zinc sulfide). The content by weight of fining agents is normally at most 1% and preferably between 0.1 and 0.6%. The composition also comprises colorants, defined more precisely below.

The following paragraphs describe in greater detail the influence of the colorants, and are applicable to all the types of glass matrix described above.

The content by weight of $Fe_2O_3$ (total iron) preferably varies from 0.9 to 1.7%, especially from 1.0 to 1.6% and even from 1.1 to 1.4%. The iron oxide may be present in ferric or ferrous form. The expression "$Fe_2O_3$ (total iron)" must therefore be understood as designating the entirety of the iron oxide present in the glass (both in ferrous and ferric form), but expressed in $Fe_2O_3$ form. Preferably, the redox ratio, defined as the ratio of the ferrous oxide content (expressed in FeO form) to the total iron content (expressed in $Fe_2O_3$ form), is comprised between 0.15 and 0.45, especially between 0.18 and 0.39 and even between 0.20 and 0.35. Too high an iron content will lead the opacity of the glass to become too high, to the point that the displays will no longer be visible through the plate. In contrast, too low a content will have the effect of making the glass too transmissive, to the point that the internal elements of the heating device will be too easily seen, to the detriment of the esthetics of the product.

The content by weight of COO preferably varies from 0.03 to 0.05%, especially from 0.035 to 0.045%. As for iron oxide, the amount of cobalt must be judiciously determined in order to allow the internal elements of the appliance to be satisfactorily hidden from view while nonetheless allowing the displays to display correctly.

The content by weight of selenium is preferably at most 0.0020%, especially 0.0010% and even 0.0005%, or even zero. This is because this element is highly volatile and causes substantial spattering in glass furnaces.

The content by weight of $Cr_2O_3$ is advantageously at most 0.05%, especially 0.02% and even 0.01%, or even zero (excluding however unavoidable impurities, for example originating from corrosion of refractories present in the melting furnace), for reasons both related to the toxicological risks of chromium and its low fusibility, which could lead to the presence of unmelted chromium oxide.

Preferably, the cited coloring agents ($Fe_2O_3$, CoO and optionally Se, $TiO_2$, $SnO_2$, and $Cr_2O_3$) are the only coloring agents present in the glass.

Since titanium oxide ($TiO_2$) may lead, in combination with iron oxide, to yellow or amber colors being obtained, and therefore to distortion of the colors of the displays, its content by weight is advantageously at most 1%, even 0.5% and even zero, excluding unavoidable impurities.

The chemical composition of the glass may also comprise other colorants, such as NiO, sulfides or even lanthanide oxides; however, it preferably does not, for reasons related to the environment and industrial hygiene, or even for reasons of cost.

The light transmission factor of the glass plates, for a thickness of 4 mm, and as defined by standard EN 410:1998, is preferably at most 10%, especially 8% and even 5% or even 4% or 3%. It is preferably at least 0.2%, especially 0.5% or even 1.0%.

The specific choice of the coloring agents and their contents generally allows a remarkably flat transmission spectrum to be obtained in the visible range. Preferably, the ratio of the transmission at a wavelength of 630 nm to the transmission at a wavelength of 430 nm is comprised between 0.3 and 3, especially between 0.5 and 2, even between 0.7 and 1.5, or even between 1.0 and 1.5. Advantageously, the transmission curve is such that the ratio of the highest transmission to the lowest transmission in the wavelength range extending from 430 nm to 630 nm is at most 3, especially at most 2 and even at most 1.5.

The color coordinates a* and b* are advantageously each comprised in a range extending from −5 to +5, for a thickness of 4 mm and taking into account illuminant D65 and a CIE 1931 reference observer as defined in standards ISO 11664-1 and -2.

The plates may be manufactured in a known way by melting powdered batch materials then forming the glass obtained. The batch materials are typically melted in refractory furnaces using burners employing air or, better still, oxygen as an oxidant and natural gas or fuel oil as a fuel. Molybdenum or platinum resistive elements submerged in the molten glass may also be used to provide all or some of the energy used to obtain the molten glass. Batch materials (silica, borax, colemanite, hydrated alumina, limestone, dolomite, etc.) are introduced into the furnace and undergo, under the effect of the high temperatures, various chemical reactions, such as decarbonization reactions, the actual melting, etc. The maximum temperature reached by the glass is typically at least 1500° C. and especially comprised between 1600 and 1700° C. As is known, the glass may be formed into plates by rolling the glass between metal or ceramic rollers, or even using a float process (technique consisting in pouring the molten glass onto a bath of molten tin).

Apart from the glass plate and at least one inductor (preferably three or four and even five inductors), the cooking appliance may comprise at least one light-emitting device and at least one command/control device, the assembly being contained in a casing.

One, the or each light-emitting device is advantageously chosen from light-emitting diodes (for example forming part of a 7-segment display), liquid-crystal displays (LCDs), light-emitting diode and optionally organic light-emitting diode (OLED) displays, and fluorescent displays (VFDs). The cooking appliance preferably comprises at least one device that emits white light. Various colors may be seen through the plate: red, green, blue, and all possible combinations thereof, including yellow, violet, white, etc. These light-emitting devices may be purely decorative, for example separating visually various zones of the plate. However, most often they will play a functional role displaying various items of information useful to the user, especially indicating heating power, temperature, cooking programs, cooking time and/or zones of the plate exceeding a preset temperature.

The command/control devices generally comprise touch-sensors, for example capacitive or infrared touch-sensors.

The internal elements are generally all fastened to a casing, often made of metal, that therefore forms the lower portion of the cooking appliance, normally hidden from view in a worktop or in the chassis of a stove.

In order to perfect the optical appearance of the assembly, it is possible to place, under the glass plate, opaque or reflective materials such as, for example, mica sheets.

The upper face of the plate may also comprise a decoration, generally made of enamel, the function of which is decorative. The decoration generally makes it possible to identify the heating zones (for example representing them in the form of a circle) and the control zones (especially when they are touch-sensitive zones) and to provide information, but it may even represent a logo.

The enamel is formed from a powder comprising a glass frit and pigments (these pigments possibly also forming part of the frit), and a medium for the application to the substrate. The glass frit is preferably obtained from a vitrifiable mixture generally comprising oxides especially chosen from oxides of silicon, zinc, sodium, boron, lithium, potassium, calcium, aluminum, magnesium, barium, strontium, antimony, titanium, zirconium and bismuth. Particularly suitable glass frits are described in patent applications FR 2 782 318 or WO 2009/092974. The pigments may be chosen from compounds containing metal oxides such as oxides of chromium, copper, iron, cobalt, nickel, etc., or may be chosen from cobalt or copper chromates, etc., the amount of pigment(s) in the frit(s)/pigment(s) mixture for example being comprised between 30 and 60% by weight. The enamel layer may especially be deposited by screen printing (the base and the pigments if needs be being suspended in a suitable medium generally intended to be consumed in a subsequent baking step, this medium possibly in particular comprising solvents, thinners, oils, resins, etc.), the thickness of the layer for example being about 1 to 6 μm.

The following examples illustrate the invention without however limiting it.

Various glasses, the chemical composition of which is recapitulated in tables 1 and 2 below, have been melted using known techniques and formed into plates. The contents indicated in this table are expressed in percentages by weight, and the $Fe_2O_3$ content corresponds to the total iron content.

TABLE 1

|  | 1 | 2 | 3 | 4 | 5 |
|---|---|---|---|---|---|
| $SiO_2$ | 65.8 | 65.8 | 78.4 | 65.8 | 78.2 |
| $Al_2O_3$ | 19.9 | 19.9 | 2.5 | 19.9 | 2.5 |
| $B_2O_3$ |  |  | 13.0 |  | 13.0 |
| $Na_2O$ | 0.2 | 0.2 | 3.4 | 0.2 | 3.4 |
| $K_2O$ | 0.2 | 0.2 | 0.6 | 0.2 | 0.6 |
| $Li_2O$ | 3.5 | 3.5 |  | 3.5 |  |
| MgO | 1.2 | 1.2 |  | 1.2 |  |
| BaO | 0.8 | 0.8 |  | 0.8 |  |
| ZnO | 1.7 | 1.7 |  | 1.7 |  |
| $TiO_2$ | 2.6 | 2.6 |  | 2.6 |  |
| $ZrO_2$ | 1.7 | 1.7 |  | 1.7 |  |
| $SnO_2$ | 0.3 | 0.3 |  | 0.3 |  |
| $Fe_2O_3$ | 1.06 | 1.06 | 1.13 | 1.27 | 1.36 |
| FeO | 0.57 | 0.68 | 0.25 | 0.82 | 0.37 |
| Se | <0.0005 | <0.0005 | <0.0005 | <0.0005 | <0.0005 |
| CoO | 0.0355 | 0.0397 | 0.0427 | 0.0413 | 0.0407 |
| $Cr_2O_3$ | 0.0730 | <0.0003 | <0.0003 | <0.0003 | 0.0005 |

TABLE 2

|  | 6 | 7 | 8 | 9 |
|---|---|---|---|---|
| $SiO_2$ | 78.2 | 78.4 | 65.8 | 67.8 |
| $Al_2O_3$ | 2.5 | 2.5 | 19.9 | 22.9 |
| $B_2O_3$ | 13.0 | 13.0 |  |  |
| $Na_2O$ | 3.4 | 3.4 | 0.2 | 0.6 |
| $K_2O$ | 0.6 | 0.6 | 0.2 | 0.3 |
| $Li_2O$ |  |  | 3.5 | 3.9 |
| MgO |  |  | 1.2 | 0.4 |
| CaO |  |  |  | 0.5 |
| BaO |  |  | 0.8 | 2.1 |
| ZnO |  |  | 1.7 | 1.6 |
| $TiO_2$ |  |  | 2.6 | 0 |
| $ZrO_2$ |  |  | 1.7 | 0 |
| $SnO_2$ |  |  | 0.3 | 0.3 |
| $Fe_2O_3$ | 1.58 | 1.20 | 1.19 | 1.14 |
| FeO | 0.40 | 0.25 | 0.704 | 0.659 |
| Se | <0.0005 | <0.0005 | <0.0005 | <0.0005 |
| CoO | 0.0420 | 0.0500 | 0.0400 | 0.0500 |
| $Cr_2O_3$ | 0.0007 | <0.0003 | <0.0003 | <0.0003 |

Examples 1, 2, 4, 8 and 9 are lithium aluminosilicate glasses, whereas glasses 3, 5, 6 and 7 are borosilicate glasses.

Figure 2:
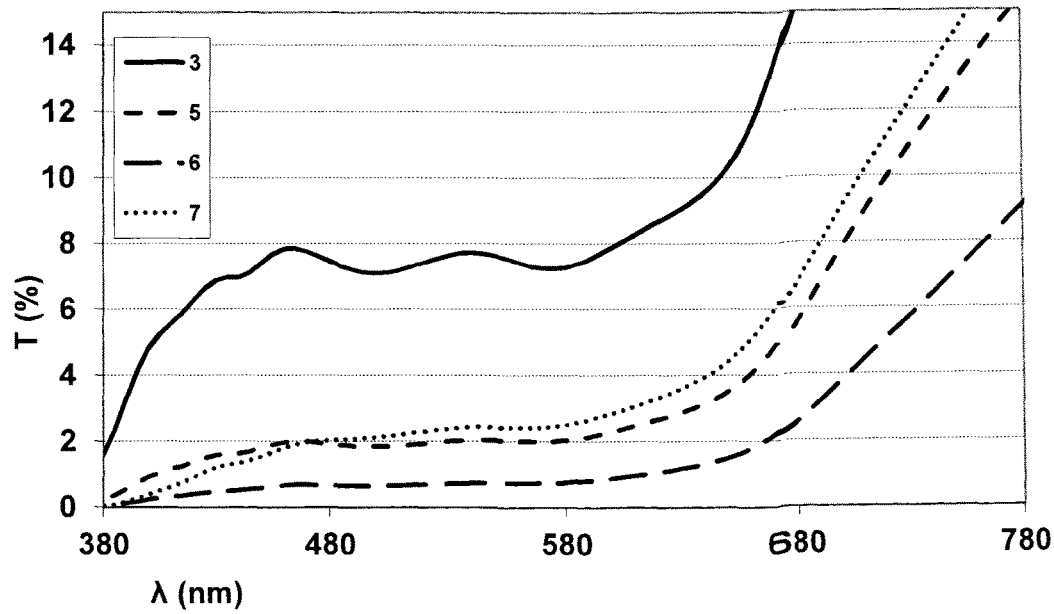

FIGS. 1 and 2 reproduce the transmission spectra in the range of the visible of these lithium aluminosilicate and borosilicate glasses, respectively. In these figures, the term λ designates wavelengths and T transmission.

Tables 3 and 4 below indicate for each of these glasses the following optical properties and characteristics:
- the thickness e of the plates expressed in mm;
- the light transmission factor as defined in standard EN410:1998, denoted "TL";
- the color coordinates L*,a*,b* taking into account illuminant D65 and the CIE 1931 reference observer as defined in standards ISO 11664-1 and -2; and
- the transmissions for wavelengths of 430, 530 and 630 nm.

TABLE 3

|  | 1 | 2 | 3 | 4 | 5 |
|---|---|---|---|---|---|
| e (mm) | 3.9 | 4.1 | 3.9 | 4.1 | 4.1 |
| TL (%) | 0.3 | 6.0 | 7.7 | 1.8 | 2.1 |
| L* | 0.2 | 29.5 | 33.3 | 14.2 | 16.1 |
| a* | 17.2 | 15.5 | 2.7 | 18.6 | 3.5 |
| b* | 16.9 | 48.0 | 1.5 | 38.0 | 3.1 |
| T(430 nm) | 0 | 0 | 6.9 | 0 | 1.6 |
| T(530 nm) | 0.02 | 3.5 | 7.6 | 0.6 | 2.0 |
| T(630 nm) | 1.23 | 12.8 | 9.0 | 5.2 | 2.9 |

TABLE 4

|  | 6 | 7 | 8 | 9 |
|---|---|---|---|---|
| e (mm) | 4.1 | 4.1 | 4.1 | 4.1 |
| TL (%) | 0.8 | 2.6 | 2.9 | 14.4 |
| L* | 7.1 | 18.1 | 19.9 | 44.8 |
| a* | 3.4 | 2.8 | 15.6 | −1.7 |
| b* | 3.7 | 8.2 | 41.6 | 16.3 |
| T(430 nm) | 0.5 | 1.2 | 0.0 | 6.2 |
| T(530 nm) | 0.7 | 2.4 | 1.5 | 14.3 |
| T(630 nm) | 1.2 | 3.6 | 7.0 | 16.8 |

The appearance of the glasses obtained is very similar to that of the glass-ceramic KeraBlack sold by the Applicant. These glasses furthermore allow white displays to be correctly displayed. The display is even excellent in the case of examples 3, 5, 6, 7 (borosilicate glass) and 9 (lithium aluminosilicate glass), which have a remarkably flat transmission curve in the range of the visible. For these examples, the white color of LED displays is perfectly rendered. For the other examples, the white color is tinted slightly yellow or orange.

Because of their advantageous properties (c/a, E.α, strain point, thermal expansion coefficient) these compositions furthermore lend themselves, after appropriate strengthening, to use in induction cooking appliances, as they pass the most severe of tests, especially tests intended to evaluate resistance to thermal shocks post-damage.

The invention claimed is:

1. A plate made of strengthened glass, the plate comprising a chemical composition comprising the following colorants, in a content varying within the limits by weight defined below:

| $Fe_2O_3$ (total iron) | 0.8 to 1.8%; |
|---|---|
| CoO | 0.02 to 0.06%; |
| Se | 0 to 0.005%; and |
| $Cr_2O_3$ | 0 to 0.1%, | wherein the plate does not comprise crystals connected by a residual vitreous phase.

2. The glass plate of claim 1, wherein a linear thermal expansion coefficient of the glass is at most $50 \times 10^{-7}$/K.

3. The glass plate of claim 1, wherein the glass is a lithium aluminosilicate, a borosilicate or an alumino-borosilicate glass.

4. The glass plate of claim 3, wherein the chemical composition further comprises:
   silica $SiO_2$ in a content by weight ranging from 49 to 75%;
   alumina $Al_2O_3$ in a content by weight ranging from 15 to 30%; and
   lithium oxide $Li_2O$ in a content by weight ranging from 1 to 8%.

5. The glass plate of claim 4, wherein the chemical composition comprises the following constituents, varying within the limits by weight defined below:

| $SiO_2$ | 49-75%; |
|---|---|
| $Al_2O_3$ | 15-30%; |
| $Li_2O$ | 1-8%; |
| $K_2O$ | 0-5%; |
| $Na_2O$ | 0-5%; |
| ZnO | 0-5%; |
| MgO | 0-5%; |
| CaO | 0-5%; |
| BaO | 0-5%; |
| SrO | 0-5%; |
| $TiO_2$ | 0-6%; |
| $ZrO_2$ | 0-5%; |
| $P_2O_5$ | 0-10%; and |
| $B_2O_3$ | 0-5%. |

6. The glass plate of claim 1, wherein the chemical composition further comprises:
   silica $SiO_2$ in a content by weight ranging from 70 to 85%;
   boron oxide $B_2O_3$ in a content by weight ranging from 8% to 20%; and
   at least one alkali-metal oxide, a total content by weight of alkali-metal oxides ranging from 1 to 10%.

7. The glass plate of claim 6, wherein the glass is a borosilicate glass in which the chemical composition further comprises the following constituents, varying within the limits by weight defined below:

| $SiO_2$ | 70-85%; |
|---|---|
| $B_2O_3$ | 8-16%; |
| $Al_2O_3$ | 0-5%; |
| $K_2O$ | 0-2%; and |
| $Na_2O$ | 1-8%. |

8. The glass plate of claim 1, wherein the glass is an alumino-borosilicate glass in which the chemical composition further comprises:
   silica $SiO_2$ in a content by weight ranging from 45% to 68%;
   alumina $Al_2O_3$ in a content by weight ranging from 8 to 20%;
   boron oxide $B_2O_3$ in a content by weight ranging from 4% to 18%; and
   at least one alkaline-earth oxide selected from the group consisting of MgO, CaO, SrO and BaO, in a total content ranging from 5 to 30%.

9. The glass plate of claim 1, wherein a content by weight of the $Fe_2O_3$ (total iron) varies from 0.9 to 1.7%.

10. The glass plate of claim 1, wherein a content by weight of the CoO varies from 0.03 to 0.05%.

11. The glass plate of claim 1, wherein a content by weight of $Cr_2O_3$ is zero.

12. The glass plate of claim 1, wherein a content by weight of the $TiO_2$ is at most 1%.

13. The glass plate of claim 1, wherein the glass is thermally strengthened.

14. An induction cooking appliance, comprising at least one inductor placed under the glass plate of claim 1.

15. The cooking appliance of claim 14, further comprising at least one device that emits white light.

16. The glass plate of claim 1, wherein a linear thermal expansion coefficient of the glass is between 30 and $45 \times 10^{-7}$/K.

17. The glass plate of claim 4, wherein the chemical composition comprises the following constituents, varying within the limits by weight defined below:

| | |
|---|---|
| $SiO_2$ | 52-75%; |
| $Al_2O_3$ | 18-27%; |
| $Li_2O$ | 2.5-5.5%; |
| $K_2O$ | 0-3%; |
| $Na_2O$ | 0-3%; |
| ZnO | 0-3.5%; |
| MgO | 0-3%; |
| CaO | 0-2.5%; |
| BaO | 0-3.5%; |
| SrO | 0-2%; |
| $TiO_2$ | 0-3%; |
| $ZrO_2$ | 0-3%; |
| $P_2O_5$ | 0-8%; and |
| $B_2O_3$ | 0-3%. |

18. The glass plate of claim 1, wherein a content by weight of the $TiO_2$ is at most 0.5%.

* * * * *